(12) United States Patent
Yomoto et al.

(10) Patent No.: US 6,323,952 B1
(45) Date of Patent: Nov. 27, 2001

(54) FLATNESS MEASURING APPARATUS (75) Inventors: Masahiko Yomoto, Urayasu; Hosei Nakahira, Bunkyo-ku; Eiji Matsukawa, Yotsukaido; Hironobu Sakuta, Chiba, all of (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 09/452,134

(22) Filed: Dec. 1, 1999

(30) Foreign Application Priority Data

Dec. 2, 1998 (JP) .................................................. 10-342520
Oct. 1, 1999 (JP) .................................................. 11-280908

(51) Int. Cl.$^7$ .................................................. G01B 11/30
(52) U.S. Cl. .......................................... 356/600; 356/512
(58) Field of Search .................................... 356/371, 445, 356/446, 376, 373, 498, 511, 512, 600, 601, 614; 702/167, 170

(56) References Cited

U.S. PATENT DOCUMENTS 4,854,708 * 8/1989 Kafri et al. ............................ 356/73
4,860,229  8/1989 Abbe et al. .
5,995,226 * 11/1999 Abe et al. ............................ 356/359
6,147,764 * 11/2000 Handa ................................... 356/512

* cited by examiner

*Primary Examiner*—Hoa Q. Pham
(74) *Attorney, Agent, or Firm*—Oliff & Berridge, PLC (57) ABSTRACT

A flatness measuring apparatus measures flatness of a substrate on which a specific pattern is to be formed by adjusting focus to a forming reference flat plane obtained based upon height data corresponding to specific measuring points of the substrate. The flatness measuring apparatus includes: an arithmetic operation device that obtains height data at predetermined measuring points of the substrate, determines a flatness judging criterion flat plane based upon height data at measuring points located at positions at which the specific measuring points are located through an arithmetic operation, determines quantities of displacement at the predetermined measuring points relative to the flatness judging criterion flat plane through an arithmetic operation, and measures the flatness of the substrate based upon the quantities of displacement.

9 Claims, 7 Drawing Sheets

PRIOR ART

FLATNESS MEASURING APPARATUS

INCORPORATION BY REFERENCE

The disclosure of the following priority application is herein incorporated by reference:
Japanese Patent Application No. 11-280908 filed Oct. 1, 1999.

BACKGROUND OF THE INVENTION

1. Field of the Invention

The present invention relates to a flatness measuring apparatus.

2. Description of the Related Art

As LSI patterns have been becoming increasingly fine in recent years, a reduction in the focal depth of optical exposure apparatuses (optical aligners) has been observed. Namely, while the wavelength must be reduced to transcribe (expose) a fine pattern, the shorter wavelength results in a reduction in the focal depth in the optical exposure apparatus since the focal depth is in proportion to the wavelength. For this reason, the quality of transcribing is determined by whether or not indentations and projections at the surface of the semiconductor wafer are contained within the focal depth, and the requirements imposed with respect to the flatness of the semiconductor wafer upon which the pattern is transcribed (exposed) are becoming increasingly rigorous. For instance, if the surface of a semiconductor wafer has undulations and the magnitude of the undulation exceeds the focal depth there will be a loss of clarity in transcribing.

In the prior art, in order to measure the flatness of a semiconductor wafer, a sensor is positioned facing opposite the two surfaces of the semiconductor wafer by holding a portion of the semiconductor wafer and the distances to the individual measuring points of the wafer are measured by scanning with the sensor. For instance, the data collection by the sensor is made to correspond to a 1 mm pitch in the transcribing area, the height distribution at the semiconductor wafer surface is measured over this 1 mm pitch and, based upon the results of the measurement, the flatness of the semiconductor water is measured.

Figure 4:
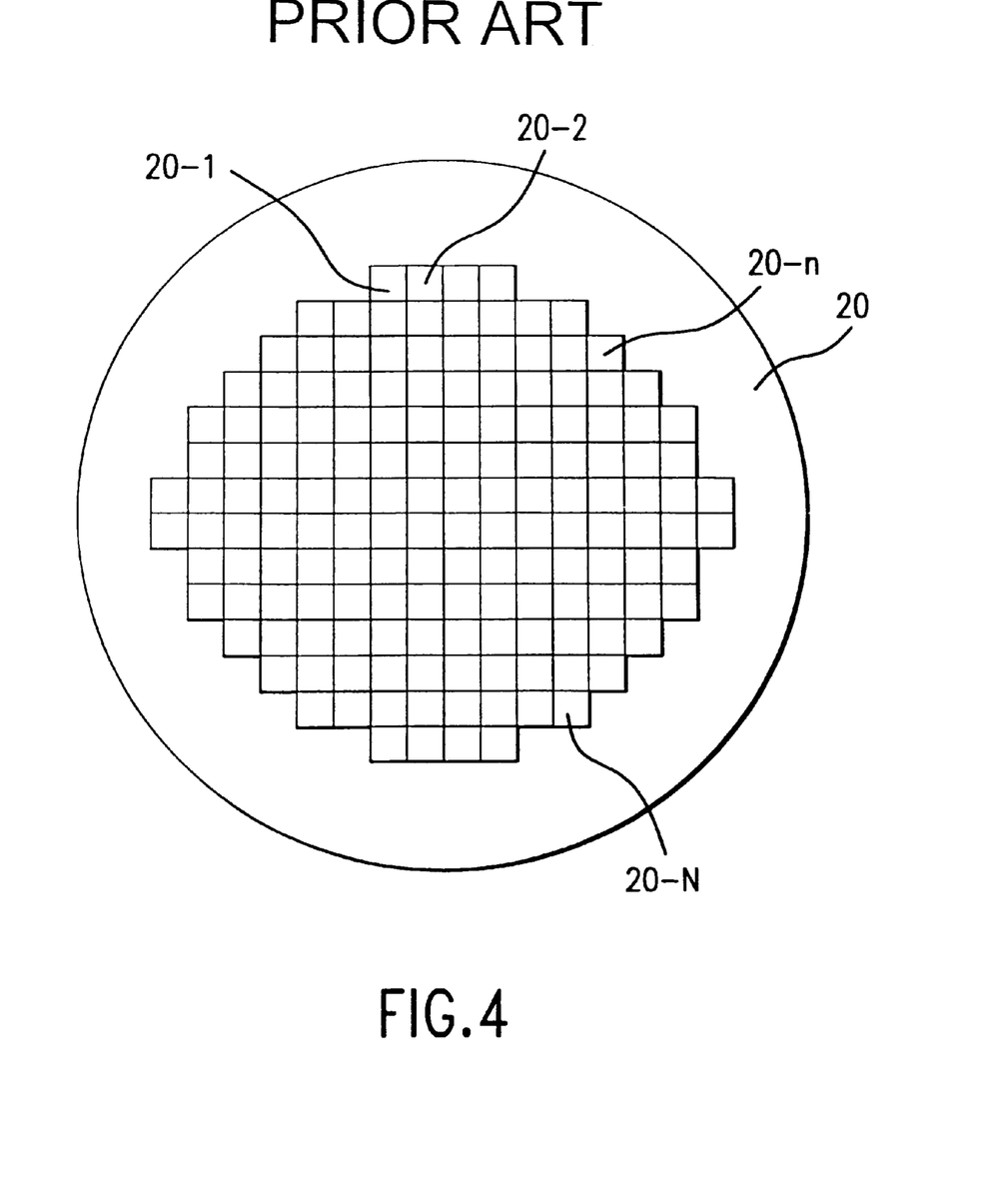
FIG. 4 illustrates transcribing areas.

FIG. 4 illustrates transcribing areas at a semiconductor wafer. The surface of the semiconductor wafer 20 is divided into a plurality of transcribing areas (20-1~20-N) (N is a positive integer) as illustrated in FIG. 4, for instance, and the flatness of the semiconductor wafer is measured in the individual transcribing areas.

Figure 5:
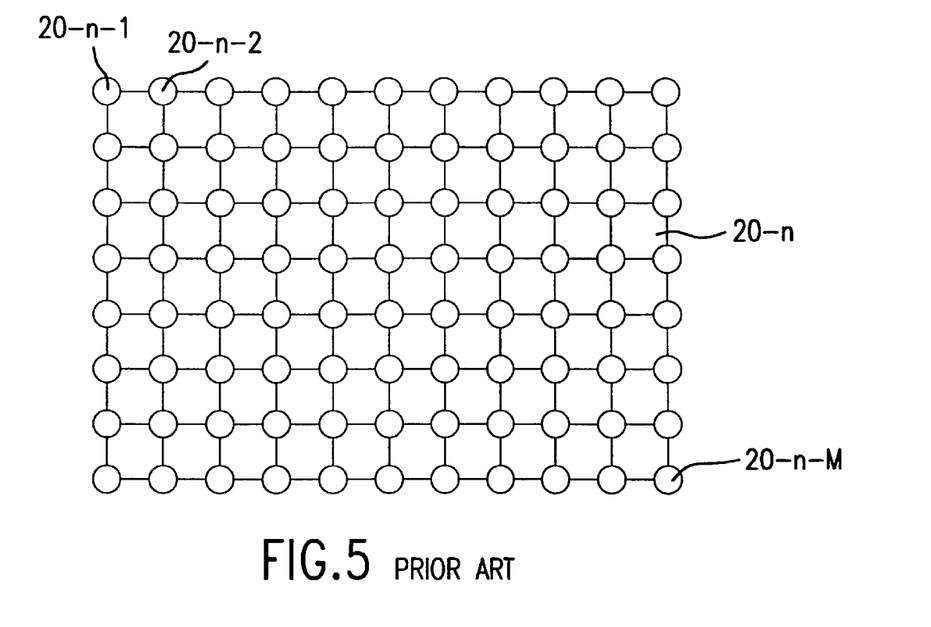
FIG. 5 illustrates measuring points used during flatness measurement.

FIG. 5 illustrates measuring points in a flatness measuring method in the prior art, in FIG. 5, which is an enlargement of one of the transcribing areas (e.g., 20-n) (n is a positive integer) in FIG. 4, a plurality of measuring points are set over for instance, 1 mm pitch in the transcribing area. The surface height of the semiconductor wafer 20 is measured at all the measuring points (20-n-1~20-n-M) (M is a positive integer).

Figure 6:
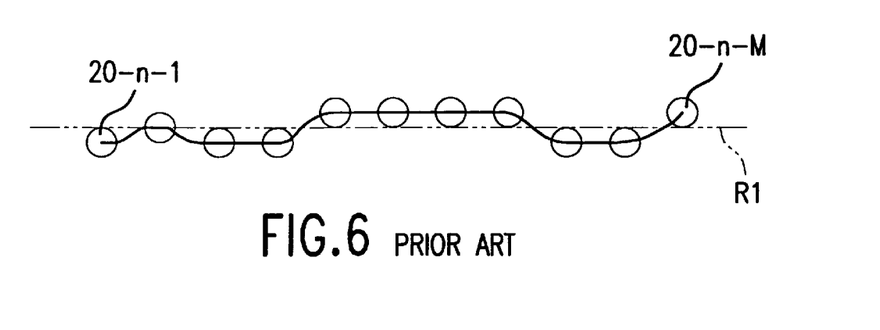
FIG. 6 illustrates the reference flat plane used during the flatness measurement.

FIG. 6 illustrates a reference flat plane used in the flatness measuring method in the prior art. Using the measurement data indicating the heights at the individual measuring points, a reference flat plane R1 that represents the transcribing area (20-n) is calculated through a method of least squares or the like. The measurement of flatness is implemented using quantities of displacement of the individual measuring points (20-n-1~20-1-M) relative to the reference flat plane R1.

Figure 7:
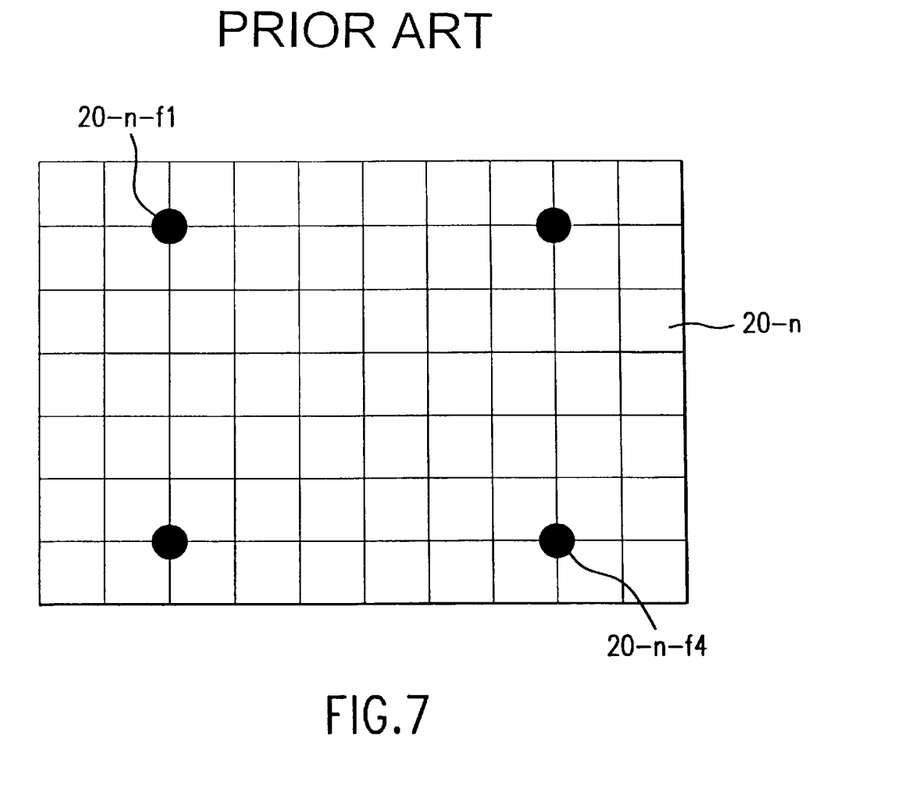
FIG. 7 illustrates measuring points used during the transcribing operation.

An optical exposure apparatus transcribes by detecting an optimal focal plane in each of the transcribing areas (20-1~20-N) with a focus sensor (e.g., a stepper AF sensor) or the like to transcribe with the focus adjusted to the focal plane. FIG. 7 illustrates measuring points used during the transcribing operation performed by the optical exposure apparatus. During the transcribing operation, the heights at a plurality (4 in FIG. 7) of specific measuring points (20-n-f1~20-n-f4) within a transcribing area are measured by the focus sensor while the semiconductor wafer 20 is held in a wafer holder.

Figure 8:
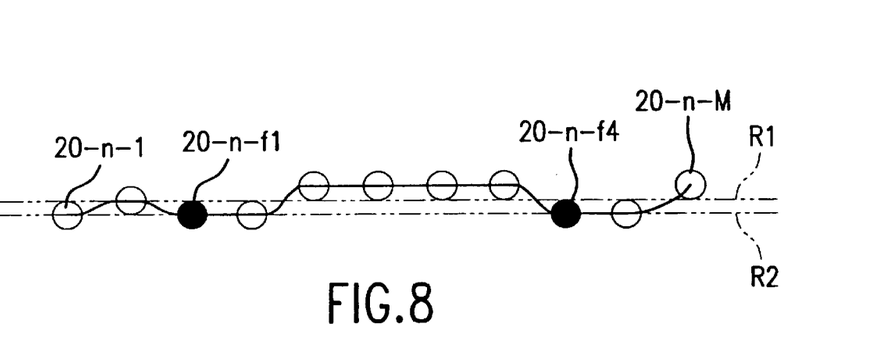
FIG. 8 illustrates the relationship between the reference flat plane used during the flatness measurement and the reference flat plane used during the transcribing operation.

FIG. 8 illustrates the relationship between the reference flat plane R1 in the flatness measuring method of the prior art and a transcribing reference flat plane R2 used by the optical exposure apparatus for the transcribing operation. Using the measurement data indicating the heights at the individual measuring points, the transcribing reference flat plane R2 that represents this particular transcribing area is calculated through the method of least squares or the like. Then the transcribing is performed with the focus adjusted to the transcribing reference flat plane R2.

However, since the number of measuring points at which the height is measured during the flatness measurement is not the same as the number of measuring points at which the height is measured during the transcribing operation, there is a problem in that the reference flat piano used for the measurement of the flatness of the semiconductor wafer 20 does not always match the reference flat plane (focal plane) used during the transcribing operation. As a result, the focusing state on the semiconductor wafer 20 during the transcribing operation cannot be assured with a high degree of accuracy.

SUMMARY OF THE INVENTION

An object of the present invention is to provide a flatness measuring apparatus that measures the flatness that corresponds to the focusing conditions during transcription.

In order to attain the above object, a flatness measuring apparatus according to the present invention that measures flatness of a substrate on which a specific pattern is to be formed by adjusting focus to a forming reference flat plane obtained based upon height data corresponding to specific measuring points of the substrate, comprises: an arithmetic operation device that obtains height data at predetermined measuring points of the substrate, determines a flatness judging criterion flat plane based upon height data at measuring points located at positions at which the specific measuring points are located through an arithmetic operation, determines quantities of displacement at the predetermined measuring points relative to the flatness judging criterion flat plane through an arithmetic operation, and measures the flatness of the substrate based upon the quantities of displacement.

This flatness measuring apparatus preferably further comprises a decision-making device that determines the substrate to be acceptable if the flatness of the substrate measured by the arithmetic operation device satisfies a specific flatness standard value set for the substrate and determines the substrate to be unacceptable otherwise.

In the flatness measuring apparatus, preferably, at least four specific measuring points are set in a forming area over which the specific pattern is formed.

Also in the flatness measuring apparatus, preferably, the specific flatness standard value set for the substrate is determined based upon a focal depth of an apparatus that forms the specific pattern on the substrate.

Also, the flatness measuring apparatus preferably further comprises a Fizeau's interferometer that obtains the height data at the predetermined measuring points of the substrate.

Also, the flatness measuring apparatus preferably further comprises a distance sensor that obtains the height data at the predetermined measuring points of the substrate.

Another flatness measuring apparatus according to the present invention that measures flatness of a substrate on which a specific pattern is to be formed by adjusting focus to a forming reference flat plane obtained based upon height data corresponding to specific measuring points of the substrate, comprises: an arithmetic operation device that determines a reference flat plane based upon heights of all measuring points in a forming area of the substrate over which the specific pattern is to be formed through an arithmetic operation, determines quantities of displacement at all the measuring points relative to the reference flat plane through an arithmetic operation, measures the flatness of the substrate based upon the quantities of displacement relative to the reference flat plane, determines a flatness judging criterion flat plane based upon height data at measuring points located at positions at which the specific measuring points are located among all the measuring points through an arithmetic operation, determines quantities of displacement at all the measuring points relative to the flatness judging criterion flat plane through an arithmetic operation and measures the flatness of the substrate based upon the quantities of displacement relative to the flatness judging criterion flat plane.

A recording medium according to the present invention has a program recorded therein for use by a flatness measuring apparatus that measures flatness of a substrate on which a specific pattern is to be formed by adjusting focus to a forming reference flat plane obtained based upon height data corresponding to specific measuring points of the substrate. The program comprises: an instruction for obtaining height data at predetermined measuring points of the substrate; an instruction for obtaining through an arithmetic operation a flatness judging criterion flat plane based upon height data at measuring points located at positions at which the specific measuring points are located; an instruction for determining through an arithmetic operation quantities of displacement at the predetermined measuring points relative to the flatness decision-making standard the surface; and an instruction for measuring the flatness of the substrate based upon the quantities of displacement.

A data signal according to the present invention embodied in a carrier wave comprises a program for use by a flatness measuring apparatus that measures flatness of a substrate on which a specific pattern is to be formed by adjusting focus to a forming reference flat plane obtained based upon height data corresponding to specific measuring points of the substrate. The program comprises: an instruction for obtaining height data at predetermined measuring points of the substrate; an instruction for obtaining through an arithmetic operation a flatness judging criterion flat plane based upon height data at measuring points located at positions at which the specific measuring points are located; an instruction for determining through an arithmetic operation quantities of displacement at the predetermined measuring points relative to the flatness decision-making standard the surface; and an instruction for measuring the flatness of the substrate based upon the quantities of displacement.

DESCRIPTION OF THE PREFERRED EMBODIMENTS

The following is an explanation of the embodiments of the present invention given in reference to the drawings.

Figure 1:
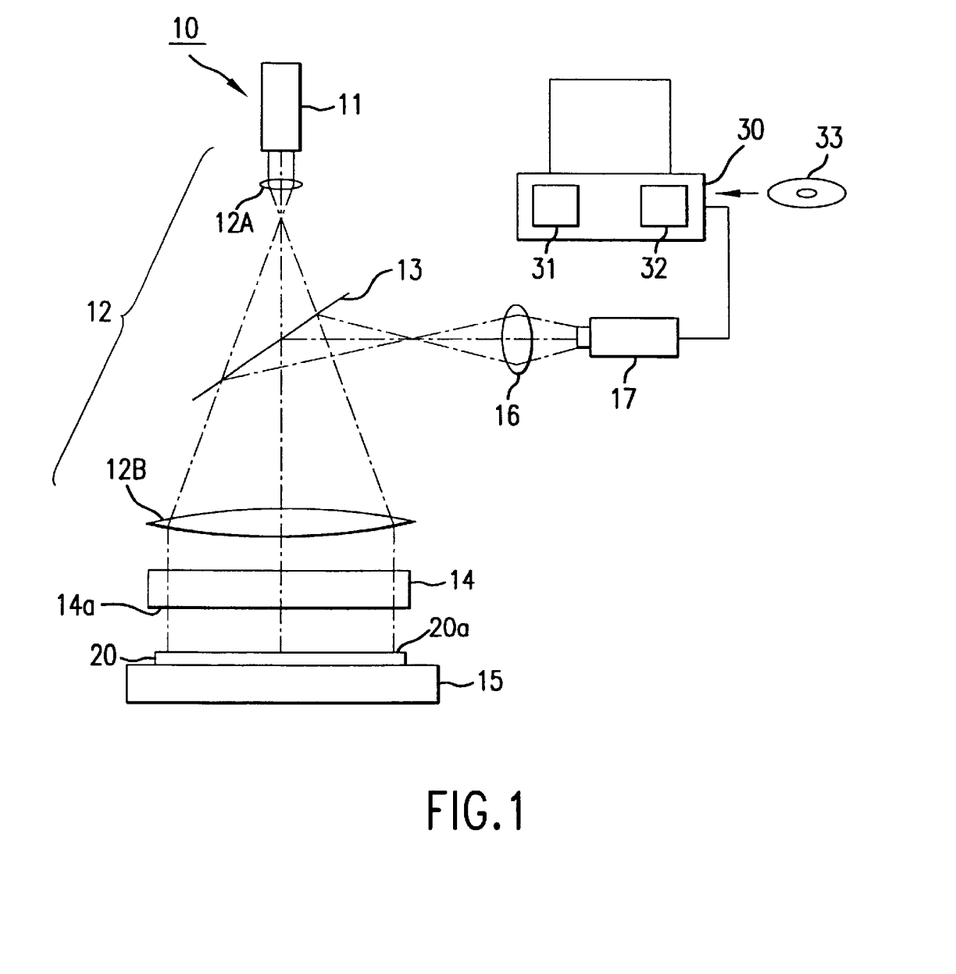
FIG. 1 illustrates a wafer flatness measuring method implemented by using a Fizeau's interferometer.

FIG. 1 illustrates a wafer flatness measuring method implemented by using Fizeau's interferometer. The Fizeau's interferometer 10 is provided with a light source 11, a beam expander 12, a half-mirror 13, a Fizeau's flat 14, a wafer holder 15, an image-forming lens 16 and a TV camera 17. The light source 11 should be constituted of a light source achieving a long coherent length such as a laser light (e.g., He-Ne laser). This improves the contrast of the interference fringe, which is to be detailed later, to enable highly accurate measurement. The beam expander 12 comprises a lens 12A and a collimator lens 12B. A holder assuming a structure identical to that of the wafer holder of a optical exposure apparatus (or a transcribing apparatus or a pattern forming apparatus) (not shown) employed when transcribing the pattern on a semiconductor wafer (substrate) 20 should be used to constitute the wafer holder 15. The description of "transcribing the pattern" may be paraphrased by "forming the pattern", "drawing the pattern", "writing the pattern", "printing the pattern" or "exposing the pattern". The image-forming lens 16 and the TV camera 17 constitute an observation optical system.

The light emitted by the light source 11 is expanded by the beam expander 12 and becomes parallel light beams before entering the Fizeau's flat 14. Part of the light that has entered the Fizeau's flat 14 is reflected by a Fizeau's flat plane 14a and becomes a reference beam. The light that is transmitted through the Fizeau's flat plane 14a is reflected at a surface 20a of the semiconductor wafer 20.

The reflected light then traces back the same optical path taken by the reference beam, is reflected by the half-mirror 13 and then reaches the observation optical system. The reflected light passes through the image-forming lens 16 and reaches the image-capturing surface of the TV camera 17. The light that has been reflected at the Fizeau's flat plane 14a and the light that has been reflected at the surface 20a of the semiconductor wafer 20 interfere and, as a result, interference fringes are formed on the image-capturing surface. A single pixel at the image-capturing element of the TV camera is made to correspond to a 1 mm pitch at the semiconductor wafer surface so that the surface of the semiconductor wafer 20 can be measured at a 1 mm pitch, for instance.

When the Fizeau's flat plane 14a is a flat plane achieving a sufficiently high degree of accuracy, the interference fringes indicate the state of the surface of the semiconductor wafer 20, i.e., the height distribution of the surface of the semiconductor wafer 20. The interference fringes are then analyzed by a computer 30 through an automatic fringe analyzing method of the known art to calculate the height distribution of the surface of the semiconductor wafer 20. The computer 30 is provided with an arithmetic device (circuit) 31 and a decision-making device (circuit) 32. These devices are achieved by executing programs. The programs executed by the computer 30 are provided on a recording medium such as a magneto-optical disk 33.

Next the measurement of the flatness of the semiconductor wafer implemented by using the data obtained through the measurement as described above is explained. The present invention differs significantly from the example of the prior art in that the calculation to determine the reference flat plane used in the flatness measurement is implemented by using measurement data obtained at measuring points that are the same specific measuring points used in calculating the reference flat plane for focusing the projection lens of the optical exposure apparatus during transcribing instead of using all the measurement data corresponding to the entire transcribing area.

Figure 2:
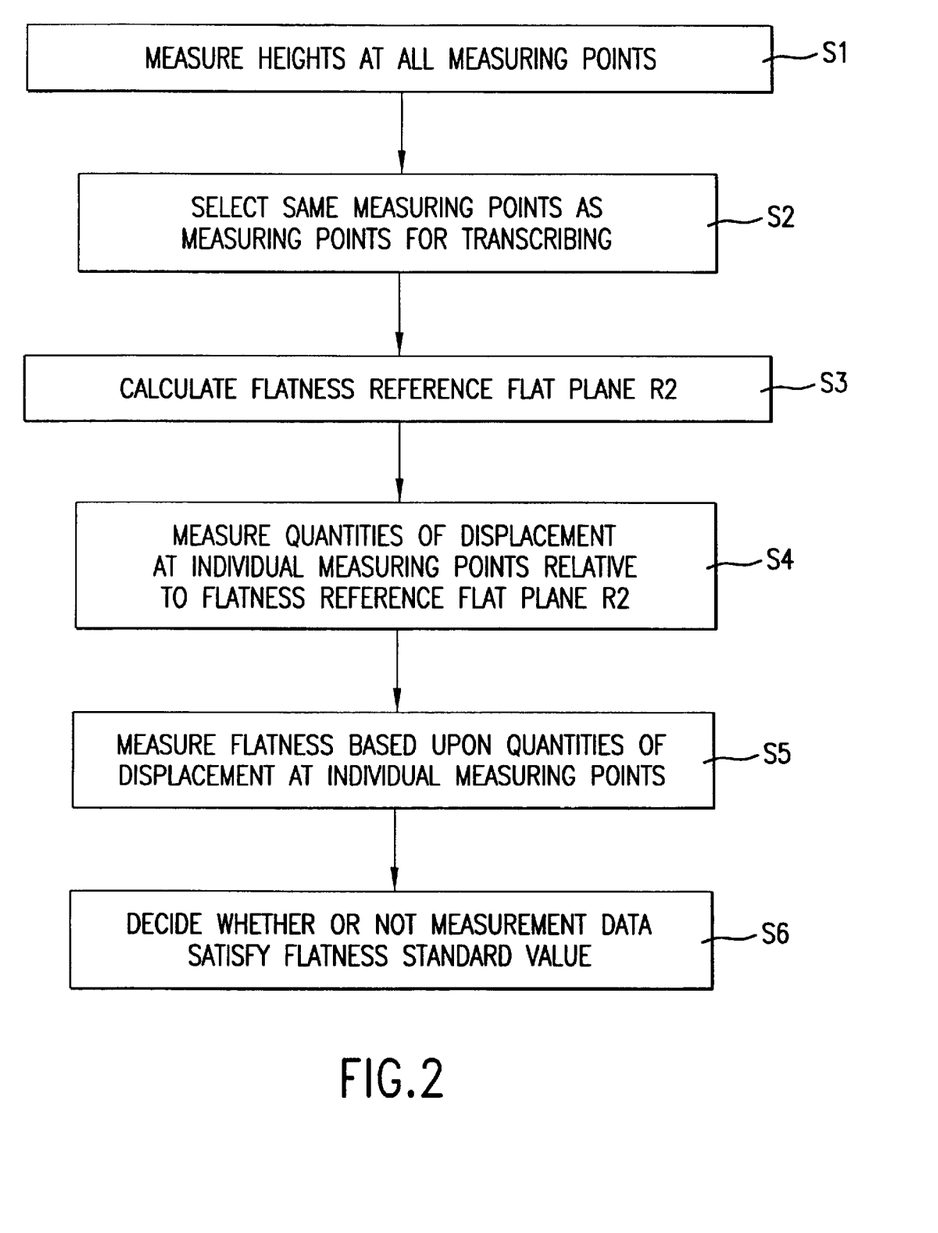
FIG. 2 is a flowchart of a flatness judging method.

FIG. 2 is a flowchart of the flatness judging method, with S1–S6 explaining the procedural steps. FIG. 2 will be explained with reference to FIGS. 7 and 8. First, the heights at all the measuring points of the semiconductor wafer 20 are measured (S1). Next, the measuring points that are the same as the specific measuring points (see FIG. 7) at which measurement is performed by a focus sensor (not shown) during transcribing are selected from all the measuring points (S2). At least four such specific measuring points should be present in a given transcribing area. Based upon the results of the measurement, a flatness judging criterion flat plane (transcribing reference flat plane) R2 used for transcribing on the semiconductor wafer 20 is calculated (S3). The calculation method is the same as one explained in the description of the related art.

It is to be noted that the specific measuring points (e.g., four points) mentioned above are determined in advance for individual optical exposure apparatus units or the like, and data pertaining to them are stored in a storage device (not shown) of the computer 30. A decision is made either automatically or manually with regard to which optical exposure apparatus model the particular semiconductor wafer 20 to be measured for flatness is prepared for, to select data corresponding to the specific measuring points that are appropriate. The positions of transcribing areas in the semiconductor wafer and the specific measuring points therein are determined based upon the outward form of the semiconductor wafer such as an orientation flat. Consequently, the correspondence between the specific measuring points at the flatness measuring apparatus and the specific points when transcribing at the optical exposure apparatus is achieved based upon the outward form of the semiconductor wafer such as the orientation flat.

Next, the quantities of displacement (distances between the flatness judging criterion flat plane R2 and the measuring points) at the individual measuring points within the transcribing area relative to the transcribing reference flat plane are measured (S4). Based upon the quantities of displacement thus measured, the flatness of the semiconductor wafer 20 is measured (S5). Then, the decision-making device 32 makes a decision as to whether or not the flatness satisfies a flatness standard value (S6). The flatness standard value is determined in advance based upon the focal depth of the optical exposure apparatus.

It is to be noted that since the flatness of the holder on which the semiconductor wafer 20 is placed, the error in automatic-focusing and the like must be taken into consideration as well as the flatness of the semiconductor wafer 20 in reality, the numerical value calculated by adding up all these errors needs to be contained within the focal depth range.

The procedure described above is implemented on all the transcribing areas. If the flatness of the semiconductor wafer measured for a wafer transcribing operation is determined to satisfy the flatness standard value, the semiconductor wafer 20 is deemed acceptable and is used in the transcribing process.

In this embodiment, in which the same measuring points as those specific measuring points used for transcribing are utilized to calculate the transcribing reference flat plane and the flatness of the semiconductor wafer is measured based upon the results of the calculation, the flatness of the semiconductor wafer can be measured under the same conditions as those under which the transcribing operation is performed. In other words, the flatness that conforms to the focusing conditions for the transcribing operation can be measured. As a result, a state of very accurate focus can be assured on the semiconductor wafer 20 during the transcribing operation.

In addition, since a plurality of specific measuring points can be arrayed in a transcribing area, specific measuring points can be secured with ease even near an edge of the semiconductor wafer 20.

Furthermore, since the flatness standard value of the semiconductor wafer 20 is set at a specific value that corresponds to the type of optical exposure apparatus used, the acceptability of the semiconductor wafer 20 can be judged based upon the correct flatness standard value.

Moreover, by using the Fizeau's interferometer 10, the entire surface of the semiconductor wafer 20 can be measured in a single process to achieve a reduction in the length of time required from the measurement.

In the prior method, a semiconductor wafer that should be judged as non-acceptable for transcribing may be judged as acceptable in measuring of flatness. However, the method according to the present invention can surely reject the situation The accuracy of judgement regarding the acceptability of semiconductor wafers achieves a high degree.

(Variations)

Figure 3:
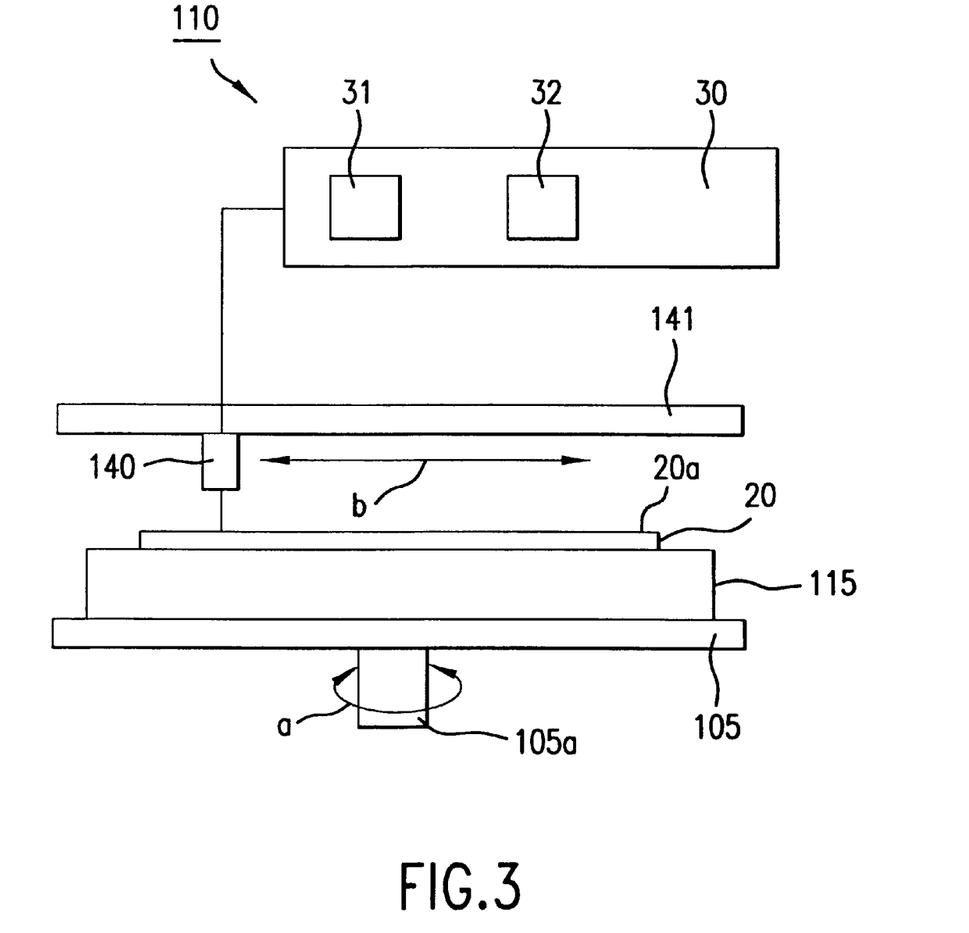
FIG. 3 illustrates a wafer flatness measuring method implemented by using a measuring apparatus provided with a distance sensor.

Next, another example of the wafer flatness measuring method is explained. FIG. 3 illustrates a wafer flatness measuring method implemented by employing a measuring apparatus provided with a distance sensor such as a capacitance sensor. The same reference numbers are assigned to the components identical to those in the system employing the Fizeau's interferometer in FIG. 1 to preclude the necessity for their explanation.

A measuring apparatus 110 is provided with a table 105, a wafer holder 115, a distance sensor 140 and a guide 141. The table 105 is capable of rotating around a shaft 105a as indicated by the arrow "a" with the wafer holder 115 for holding the semiconductor wafer 20 mounted on its upper surface. The distance sensor 140, which may be constituted of an optical sensor or a capacitance sensor, measures the distances to the individual measuring points at a surface 20a of the semiconductor wafer 20. The distance sensor 140 is mounted at the guide 141 so that it can move parallel to the semiconductor wafer 20 as indicated by the arrow "b." It is to be noted that from the viewpoint of assuring a high degree of reliability in the decision-making, it is desirable to use the same focus sensor employed in determining the focusing position during transcribing to constitute the distance sensor 140.

The height distribution of the surface 20a of the semiconductor wafer is measured by moving the distance sensor 140 parallel to the semiconductor wafer 20 and rotating the table 105 at the same time. The results of the measurement are analyzed by the computer 30 and the height distribution at the surface of the semiconductor wafer 20 is calculated.

After the state of the surface of the semiconductor wafer 20 is calculated by the individual devices as described above, the flatness of the semiconductor wafer 20 is measured through the procedure in the flowchart in FIG. 2.

When this measuring apparatus is employed, too, the flatness of the semiconductor wafer 20 is measured by using the same reference planes as those used for transcribing to obtain through the measurement a degree of flatness that conforms to the focusing conditions for the transcribing operation.

Yet another flatness measuring method is now explained. In this flatness measuring method, a reference flat plans R1 of the semiconductor wafer 20 is calculated based upon the results of measurement performed at all the measuring points at the semiconductor wafer 20. Also, the same measuring points as those specific measuring points at which the measurement is performed using the focus sensor during the transcribing operation are selected among all the measuring points at the semiconductor wafer 20, and a flatness judging criterion flat plane R2 of the semiconductor wafer is calculated based upon the results of the measurement performed at those measuring points. The flatness of the semiconductor wafer 20 is measured based upon, quantities of displacement at all the measuring points within the transcribing area relative to the reference flat plane R1 and also the flatness of the semiconductor wafer 20 is measured based upon the quantities of displacement at the individual measuring points within the transcribing area relative to the flatness judging criterion flat plane R2.

Then, the difference between the flatness obtained relative to the reference flat plane R1 and the flatness obtained relative to the flatness judging criterion flat plane R2 is calculated, and if the difference is equal to or greater than a specific value, the site (transcribing area) is brought up on a display (not shown) for displaying non-acceptability. By adopting this flatness measuring method, in which the flatness of the semiconductor wafer 20 is measured based upon the quantities of displacement relative to the reference flat plane R1 and the quantities of displacement relative to the flatness judging criterion flat plane R2 at the flatness measuring apparatus, the focusing state during the transcribing operation can be predicted and measured with a higher degree of,accuracy compared to the previous embodiment.

It is to be noted that while the explanation is given above in reference to the embodiments in which the present invention is adopted in an optical exposure apparatus, the present invention may be adopted in an exposure apparatus or a transcribing apparatus using x-rays or electron beams. In other words, the present invention may be adopted in a substrate that is used in any type of apparatus in which a specific pattern is formed on the substrate by any type of means.

While the explanation is given above in reference to the embodiments on an example in which the programs to be executed by the computer 30 are provided on a recording medium such as a magneto-optical disk 33, a recording medium other than a magneto-optical disk may be used Any type of recording media, including CD-ROM, CD-R, magnetic tape and DVD may be employed. In addition, these programs may be provided through a transmission medium such as a telecommunication line a typical example of which is the internet. In other words, the programs may be converted to signals embodied in a carrier wave that transmits through the transmission medium, and transmitted.

Figure 9:
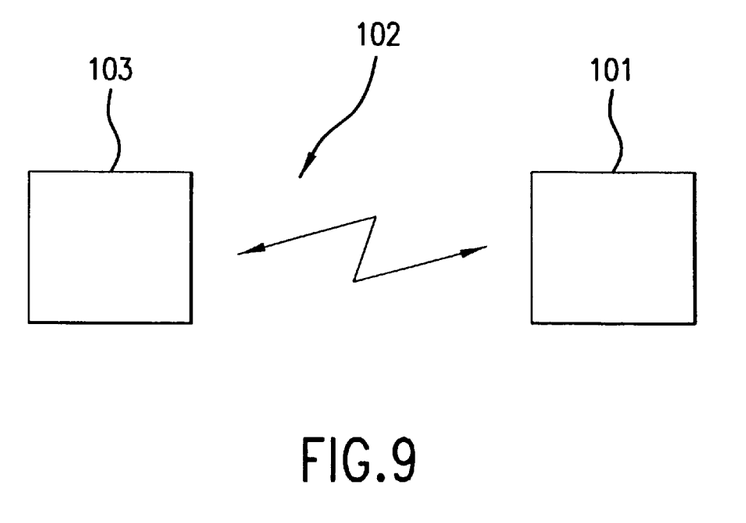
FIG. 9 illustrates how a program may be provided through a telecommunications line.

FIG. 9 illustrates how the programs may be provided in this manner. A computer 101 is the computer that executes the programs described above and is similar to the computer 30 in FIG. 1. The computer 101 has a function of connecting with a telecommunication line 102. A computer 103 is a server computer that stores and provides the programs. The telecommunication line 102 may be a telecommunication line such as the internet or a personal computer communication network, or it may be a dedicated telecommunication line. The telecommunication line 102 may be a telephone line or a wireless telephone line such as a mobile telephone line.

What is claimed is:

1. A flatness measuring apparatus that measures flatness of a substrate on which a specific pattern is to be formed by adjusting focus to a forming reference flat plane obtained based upon height data corresponding to specific measuring points of the substrate, prior to a process in which the specific pattern is formed on the substrate, comprising:

an arithmetic operation device that obtains height data at predetermined measuring points of the substrate, selects measuring points corresponding to the specific measuring points among the predetermined measuring points of the substrate, determines a flatness judging criterion flat plane based upon height data at the selected measuring points through an arithmetic operation, determines quantities of displacement at the predetermined measuring points relative to said flatness judging criterion flat plane through an arithmetic operation, and measures the flatness of the substrate based upon the quantities of displacement.

2. A flatness measuring apparatus according to claim 1, further comprising:

a decision-making device that determines the substrate to be acceptable if the flatness of the substrate measured by said arithmetic operation device satisfies a specific flatness standard value set for the substrate and determines the substrate to be unacceptable otherwise.

3. A flatness measuring apparatus according to claim 2, wherein said specific flatness standard value set for the substrate is determined based upon a focal depth of an apparatus that forms the specific pattern on the substrate.

4. A flatness measuring apparatus according to claim 1, wherein at least four specific measuring points are set in a forming area over which the specific pattern is formed.

5. A flatness measuring apparatus according to claim 1, further comprising:

a Fizeau's interferometer that obtains the height data at the predetermined measuring points of the substrate.

6. A flatness measuring apparatus according to claim 1, further comprising:

a distance sensor that obtains the height data at the predetermined measuring points of the substrate.

7. A flatness measuring apparatus that measures flatness of a substrate on which a specific pattern is to be formed by adjusting focus to a forming reference flat plane obtained based upon height data corresponding to specific measuring points of the substrate, prior to a process in which the specific pattern is formed on the substrate, comprising:

an arithmetic operation device that determines a reference flat plane based upon heights of all measuring points in a forming area of the substrate over which the specific pattern is to be formed through an arithmetic operation, determines quantities of displacement at all the measuring points relative to the reference flat plane through an arithmetic operation, measures the flatness of the substrate based upon the quantities of displacement relative to said reference flat plane, selects measuring points corresponding to the specific measuring points among all the measuring points of the substrate, determines a flatness judging criterion flat plane based upon height data at the selected measuring points through an arithmetic operation, determines quantities of displacement at all the measuring points relative to said flatness judging criterion flat plane through an arithmetic operation and measures the flatness of the substrate based upon the quantities of displacement relative to said flatness judging criterion flat plane.

8. A recording medium having recorded therein a program for use by a flatness measuring apparatus that measures flatness of a substrate on which a specific pattern is to be formed by adjusting focus to a forming reference flat plane obtained based upon height data corresponding to specific measuring points of the substrate, prior to a process in which the specific pattern is formed on the substrate, the program comprising:

an instruction for obtaining height data at predetermined measuring points of the substrate;

an instruction for selecting measuring points corresponding to the specific measuring points among the predetermined measuring points of the substrate;

an instruction for obtaining through an arithmetic operation a flatness judging criterion flat plane based upon height data at the selected measuring points;

an instruction for determining through an arithmetic operation quantities of displacement at the predetermined measuring points relative to said flatness judging criterion flat plane; and an instruction for measuring the flatness of the substrate based upon said quantities of displacement.

9. A data signal embodied in a carrier wave comprising a program for use by a flatness measuring apparatus that measures flatness of a substrate on which a specific pattern is to be formed by adjusting focus to a forming reference flat plane obtained based upon height data corresponding to specific measuring points of the substrate, prior to a process in which the specific pattern is formed on the substrate, the program comprising:

an instruction for obtaining height data at predetermined measuring points of the substrate;

an instruction for selecting measuring points corresponding to the specific measuring points among the predetermined measuring points of the substrate;

an instruction for obtaining through an arithmetic operation a flatness judging criterion flat plane based upon height data at the selected measuring points;

an instruction for determining through an arithmetic operation quantities of displacement at the predetermined measuring points relative to said flatness judging criterion flat plane; and an instruction for measuring the flatness of the substrate based upon said quantities of displacement.

* * * * *